(12) United States Patent
Ognibene

(10) Patent No.: US 10,730,546 B2
(45) Date of Patent: Aug. 4, 2020

(54) STEERING SYSTEM

(71) Applicant: OGNIBENE POWER S.P.A., Reggio Emilia (IT)

(72) Inventor: Claudio Ognibene, Reggio Emilia (IT)

(73) Assignee: OGNIBENE POWER S.P.A., Reggio Emilia (IT)

(*) Notice: Subject to any disclaimer, the term of this patent is extended or adjusted under 35 U.S.C. 154(b) by 257 days.

(21) Appl. No.: 15/905,615

(22) Filed: Feb. 26, 2018

(65) Prior Publication Data
US 2018/0251150 A1 Sep. 6, 2018

(30) Foreign Application Priority Data
Mar. 3, 2017 (IT) .......................... 102017000023856

(51) Int. Cl.
*B62D 5/04* (2006.01)
*F16H 25/22* (2006.01)
*F16H 25/20* (2006.01)

(52) U.S. Cl.
CPC ......... *B62D 5/0427* (2013.01); *B62D 5/0403* (2013.01); *B62D 5/0448* (2013.01);
(Continued)

(58) Field of Classification Search
CPC .... B62D 5/003; B62D 5/0403; B62D 5/0427; B62D 5/0445; B62D 5/0481;
(Continued)

(56) References Cited

U.S. PATENT DOCUMENTS

| 4,900,059 A | * | 2/1990 | Kinoshita | .............. B62D 1/181 280/775 |
| 2008/0011537 A1 | * | 1/2008 | Ozsoylu | ................... B62D 5/04 180/422 |

(Continued)

FOREIGN PATENT DOCUMENTS

DE 102009049936 A1 4/2011
JP 2008008470 A 1/2008
(Continued)

OTHER PUBLICATIONS

ISO International Organization for Standardization, ISO 25119-1,-2,-3,-4 "Tractors and machinery for agriculture and forestry—Safety-related parts of control systems", website:http://www.iso.org/search.html?q=iso%2025119. Related article: "Improving farm safety: standards for agricultural machinery just updated", Author:Clare Naden, Date: Nov. 5, 2018, website: https://www.iso.org/news/ref2343.html.†

*Primary Examiner* — Jacob D Knutson
*Assistant Examiner* — Marlon A Arce
(74) *Attorney, Agent, or Firm* — Volpe and Koenig, P.C.

(57) ABSTRACT

A steering system equipped with a linear electric actuator includes: a casing, a shaft slidably coupled to the casing with respect to a sliding axis and provided with an end that protrudes externally from said casing, an electric motor, which is housed in the casing and provided with a stator and a rotor that is axially hollow and coaxial with the shaft, in which the rotor is operable in rotation with respect to an axis of rotation parallel to the sliding axis, a nut screw integrated in rotation with the rotor of the motor and provided with an internal thread, the nut screw includes a first cylindrical portion and a second cylindrical portion, axially arranged side by side, a joint adapted to make the first cylindrical portion and the second cylindrical portion integrated in
(Continued)

rotation, and a helical groove surface integrated with the shaft and coupled to the internal thread.

11 Claims, 14 Drawing Sheets

(52) U.S. Cl.
CPC . *F16H 25/2204* (2013.01); *F16H 2025/2031* (2013.01); *F16H 2025/2078* (2013.01)

(58) Field of Classification Search
CPC ............... B62D 5/0448; F16H 25/2204; F16H 2025/2031; F16H 2025/2078
See application file for complete search history.

(56) References Cited

U.S. PATENT DOCUMENTS

| | | | |
|---|---|---|---|
| 2010/0200326 A1* | 8/2010 | Asakura | B62D 5/0427 180/444 |
| 2018/0251150 A1† | 2/2018 | Ognibene | |
| 2019/0351932 A1* | 11/2019 | Washnock | B62D 3/08 |

FOREIGN PATENT DOCUMENTS

| | | | |
|---|---|---|---|
| WO | 0172571 | A2 | 10/2001 |
| WO | WO 0172571 | * | 10/2001 |

\* cited by examiner
† cited by third party

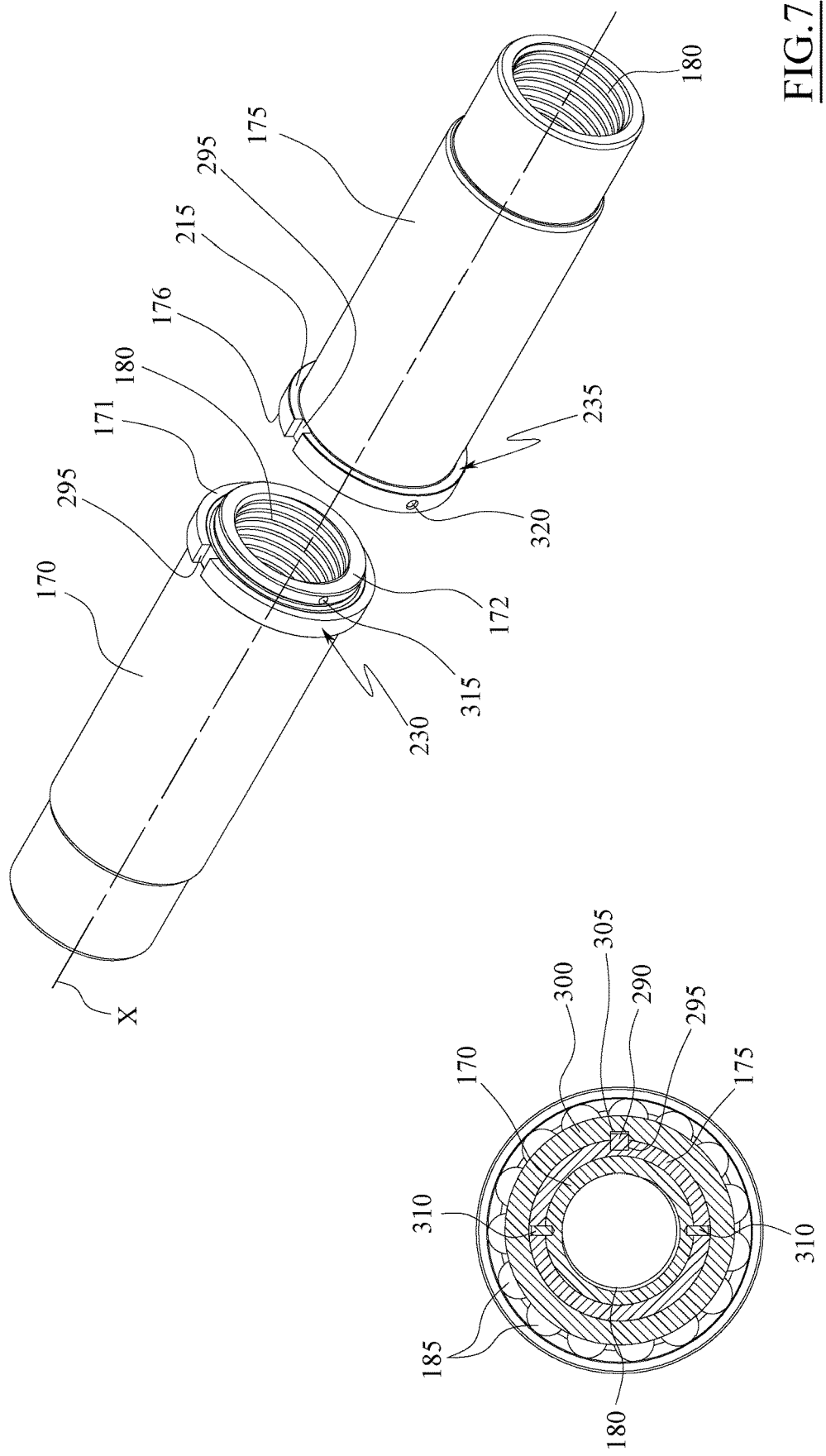

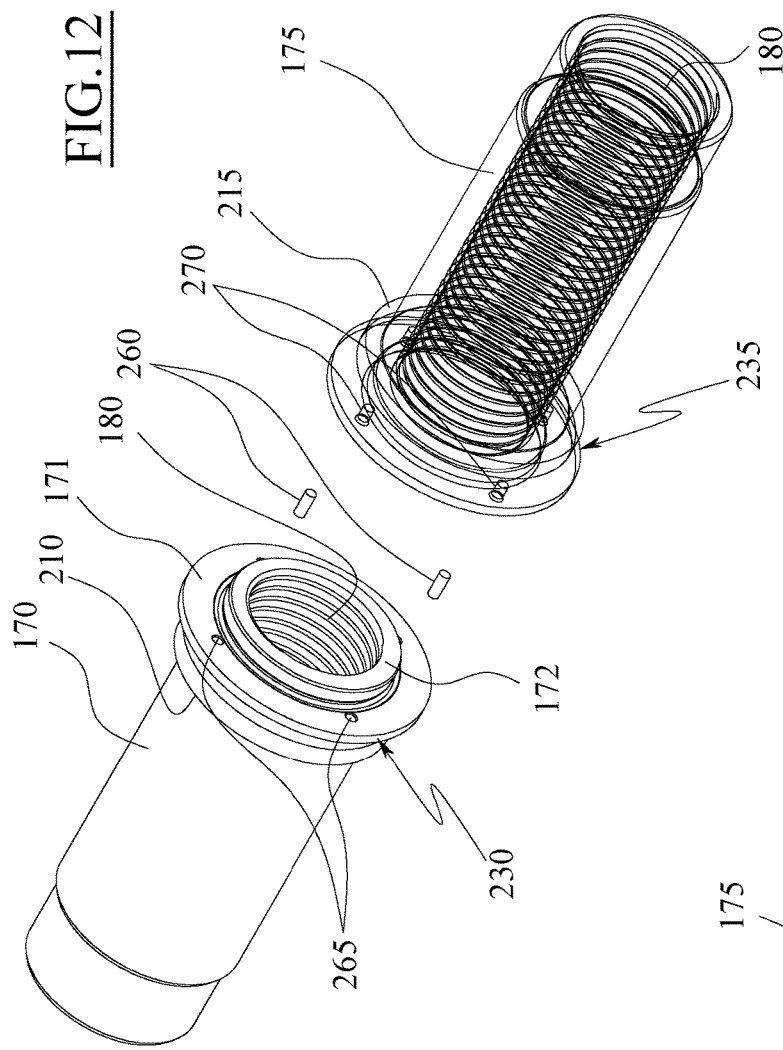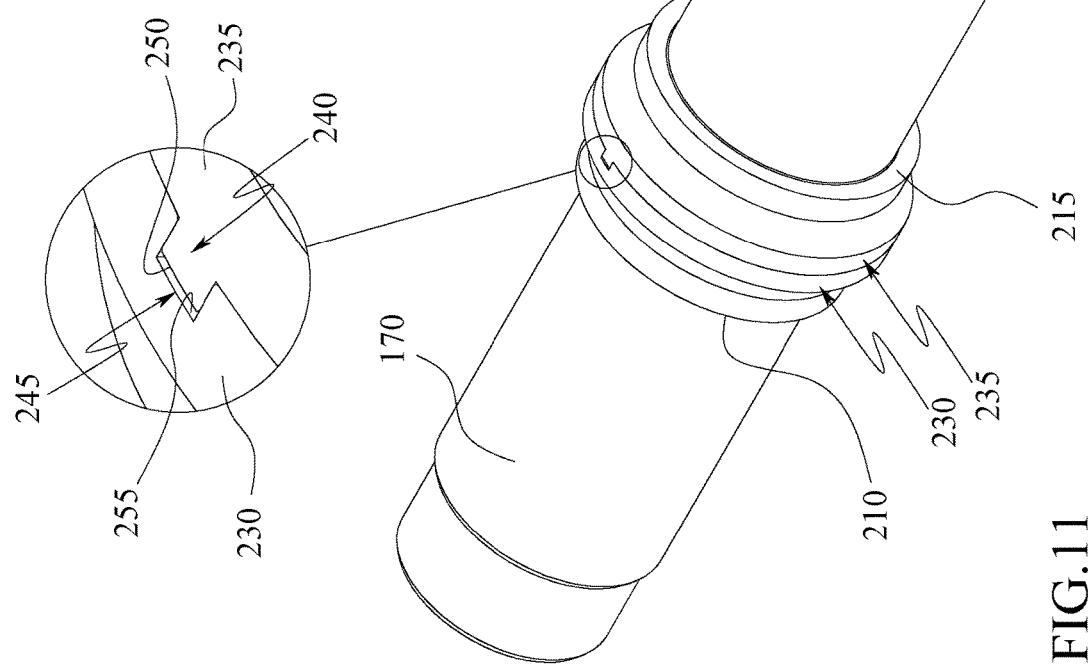

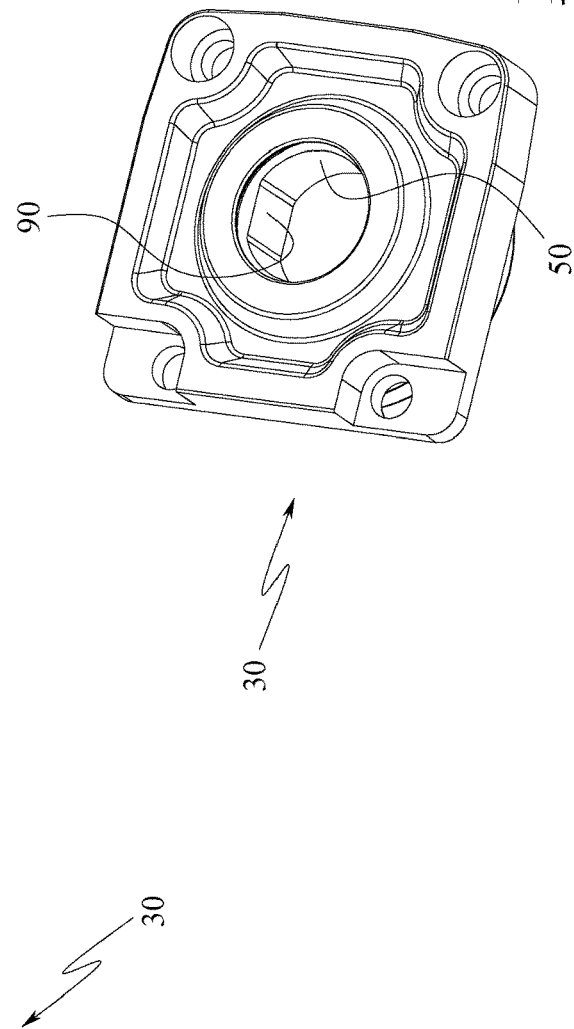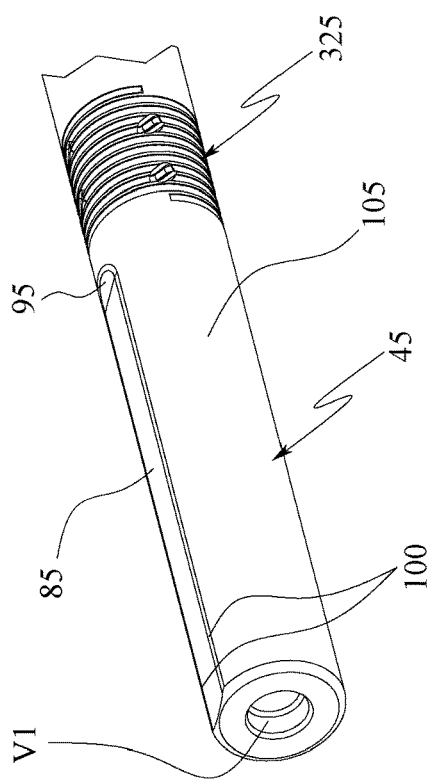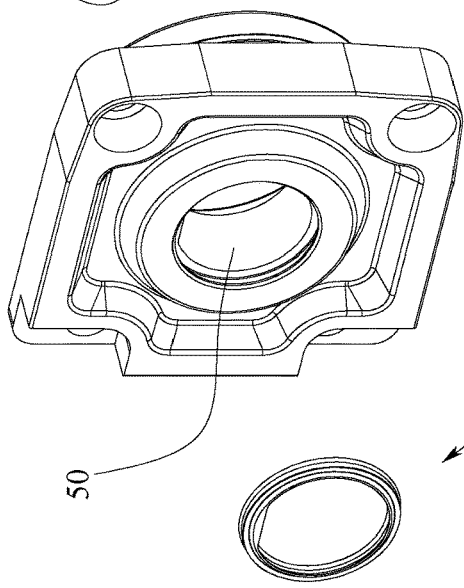

STEERING SYSTEM

TECHNICAL FIELD

The present invention relates to a steering system, in particular a steering system comprising a linear electric actuator provided with a ball bearing screw.

BACKGROUND

Generally, steering systems comprise at least a pair of linkages connected to the wheels of the vehicle on which the steering system itself is mounted, a linear actuator, for example electric, provided with a shaft whose ends are associated with said linkages, and a drive mechanism adapted to govern the actuator.

By acting on the drive mechanism it is possible to move the shaft of the actuator toward one or the other wheel by tilting the wheels with respect to the forward direction, in order to steer the vehicle.

A known solution provides that the traversing actuation of the shaft is performed by means of a recirculating ball bearing screw system.

In particular, an outer thread (or more generally an external helical groove) formed on the shaft shell is coupled, through the interposition of balls to a nut screw (understood as a body provided with an internal thread).

The actuation of the shaft is carried out by rotating the nut screw by means of an electric motor: the shaft, not being able to rotate on itself because its ends are hinged to linkages, moves along the axis of rotation of the nut screw.

This type of actuators for steering systems require that the portion of shaft protruding externally from the casing is not equipped with the external thread, otherwise it would not be possible to prevent the ingress of dirt and foreign bodies inside the casing.

For this reason, the shaft portion provided with an external thread has an axial extension limited with respect to the total length of the shaft and must be coupled to a nut screw having an axial extension greater than the axial length of the shaft.

The production of nut screws for steering systems takes place by means of chip removal from an axially hollow cylindrical body which has previously undergone a process of internal adjustment.

In the case in which the cylinder is particularly long, for example because the required length toward the shaft is very high, it is particularly difficult and expensive, if not impossible, to carry out the aforesaid internal adjustment with tolerances reduced adequately.

One purpose of this invention is to solve this drawback of the prior art, in the context of a simple, rational and low-cost solution.

This purpose is achieved by the features of the invention set forth in the independent claim.

The dependent claims outline preferred and/or particularly advantageous aspects of the invention.

SUMMARY

The invention makes available a steering system equipped with a linear electric actuator comprising: a casing, a shaft slidably associated to the casing with respect to a sliding axis and provided with an end that protrudes externally from said casing, an electric motor, which is housed in the casing and is provided with a stator and a rotor that is axially hollow and coaxial with the shaft, in which the rotor is operable in rotation with respect to an axis of rotation parallel to the sliding axis, a nut screw integrated in rotation with the rotor of the motor and provided with an internal thread, in which the said nut screw comprises a first cylindrical portion and a second cylindrical portion axially arranged side by side, a joint designed to make the first cylindrical portion and the second cylindrical portion integrated in rotation, and a helical groove surface integrated with the shaft and coupled to the internal thread.

Thanks to this solution it is possible to separately produce an internal thread in the first cylindrical portion and an internal thread in the second cylindrical portion configured as the continuation of the thread of the first portion, obtaining in a simple and economical way female nut screws having a high axial length.

According to one aspect of the invention, the joint may comprise a first flange integrated in rotation with the first cylindrical portion and a second flange integrated in rotation with the second cylindrical portion.

In this way the connection between the first cylindrical portion and the second cylindrical portion of the nut screw is cheap and reliable.

According to a further aspect of the invention, the joint may comprise a timing pin housed in a respective seat formed in the first flange and the second flange.

Thanks to this solution it is possible to synchronise the threading of the first cylindrical portion with the threading of the second cylindrical portion, either during the production of these threads or during the assembly of the nut screw.

According to another aspect of the invention, the actuator may comprise a number of rolling bearings, at least one of which is provided with a surface for the rolling of rolling bodies, which is formed in a between the first flange and the second flange.

In this way it is possible to reduce the axial dimensions of the actuator, making it particularly compact.

According to a further aspect of the invention, the actuator may comprise: a further electric motor, housed in the casing and axially alongside the motor, equipped with a stator and a rotor that is axially hollow and coaxial with the shaft, in which the rotor is operable in rotation with respect to an axis of rotation parallel to the sliding axis and wherein the nut screw is integrated in rotation with the rotor of the additional motor.

This increases the reliability of the steering system, since in the event of a failure of an engine, the actuator does not lose functionality.

According to another aspect of the invention, the helical groove surface may be formed in an axially hollow cylindrical body, fitted on the shaft and connected in integration with it.

Thanks to this solution the mechanical strength and fatigue of the shaft is not weakened by the thread and it is therefore possible to provide a shaft that is compact, lightweight and low cost. It is also possible to produce the shaft and the second cylindrical body in different materials and/or characterised by different treatments, thus improving the efficiency and duration of the electric linear actuator.

According to a further aspect of the invention, the actuator may comprise a number of balls interposed between said helical groove external and the internal thread of the nut for the coupling of the internal thread with the helical groove outside, and recirculation means for the recirculation of the balls.

In this way it reduces the wear of the components, the noisiness of the mechanism and the engine power absorbed by friction.

According to another aspect of the invention, the convolution of the internal thread in correspondence with a junction area between the first cylindrical portion and the second cylindrical portion of the nut screw may have a cross section having a width greater than the cross section of the other convolutions of the internal thread.

In this way the wear of the spheres is avoided and thereby also the generation of noise due to collisions in the passage between the first cylindrical portion and the second cylindrical portion of the nut screw. Moreover this enlarged convolution solves the problem of the inevitable differences due to dimensional tolerances between the threading of the first cylindrical portion and the threading of the second cylindrical portion.

According to another aspect of the invention, the shaft is provided with a first portion which is inserted slidingly, with respect to a sliding axis, in an opening of the casing and protrudes externally from said casing, in which the opening and the first portion of the shaft are configured so as to define a prismatic connection.

Thanks to this solution it is possible to prevent the shaft on its axis, thus ensuring its correct operation.

Advantageously, the steering system may comprise a steering linkage mechanically connected to the free end of the first portion of the shaft projecting from the casing.

The invention also makes available a linear electric actuator for steering systems comprising: a casing, a shaft slidably associated to the casing with respect to a sliding axis and provided with an end that protrudes externally from said casing, an electric motor, which is housed in the casing and is provided with a stator and a rotor that is axially hollow and coaxial with the shaft, in which the rotor is operable in rotation with respect to an axis of rotation parallel to the sliding axis, a nut screw integrated in rotation with the rotor of the motor and provided with an internal thread, in which the said nut screw comprises a first cylindrical portion and a second cylindrical portion axially arranged side by side, a joint designed to make the first cylindrical portion and the second cylindrical portion integrated in rotation, and a helical groove surface integrated with the shaft and coupled to the internal thread.

BRIEF DESCRIPTION OF THE DRAWINGS

Further characteristics and advantages of the invention will become apparent by reading the following description provided by way of illustration, with the aid of the Figures illustrated in the attached tables.

FIG. 6 is a sectional view of the actuator of FIG. 2 according to plane VI-VI.

FIG. 7 is an exploded view of an embodiment of a nut screw of the actuator according to the invention.

FIG. 11 is an exploded view of another embodiment of the nut screw of the actuator.

FIG. 12 is a perspective view of a further embodiment of the nut screw of the actuator.

FIG. 14 is an exploded view of a detail of the actuator.

FIG. 15 is a perspective view of a detail of the actuator.

DETAILED DESCRIPTION OF THE PREFERRED EMBODIMENTS

Figure 1:
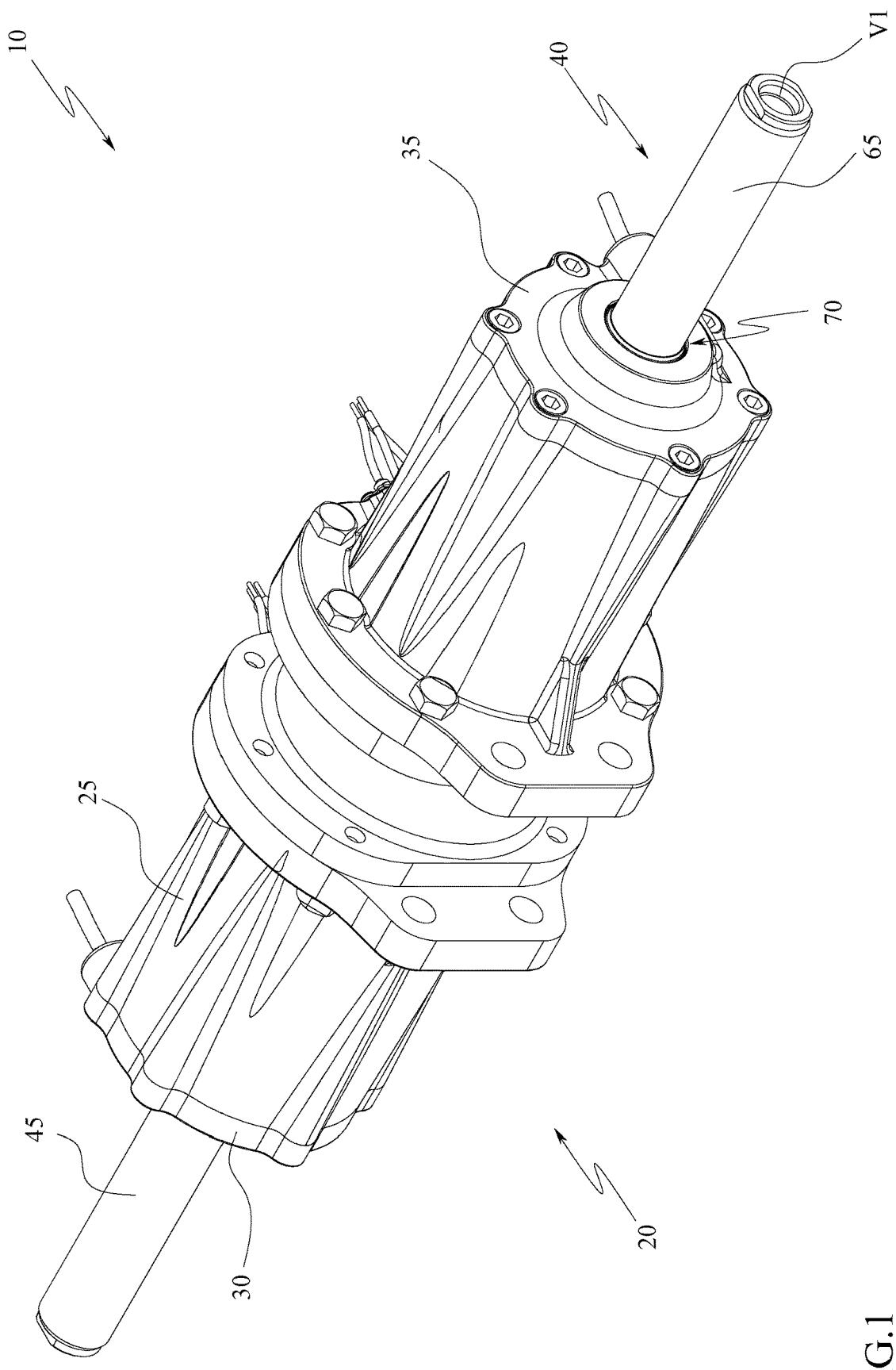
FIG. 1 is a perspective view of an actuator according to the invention.
Figure 2:
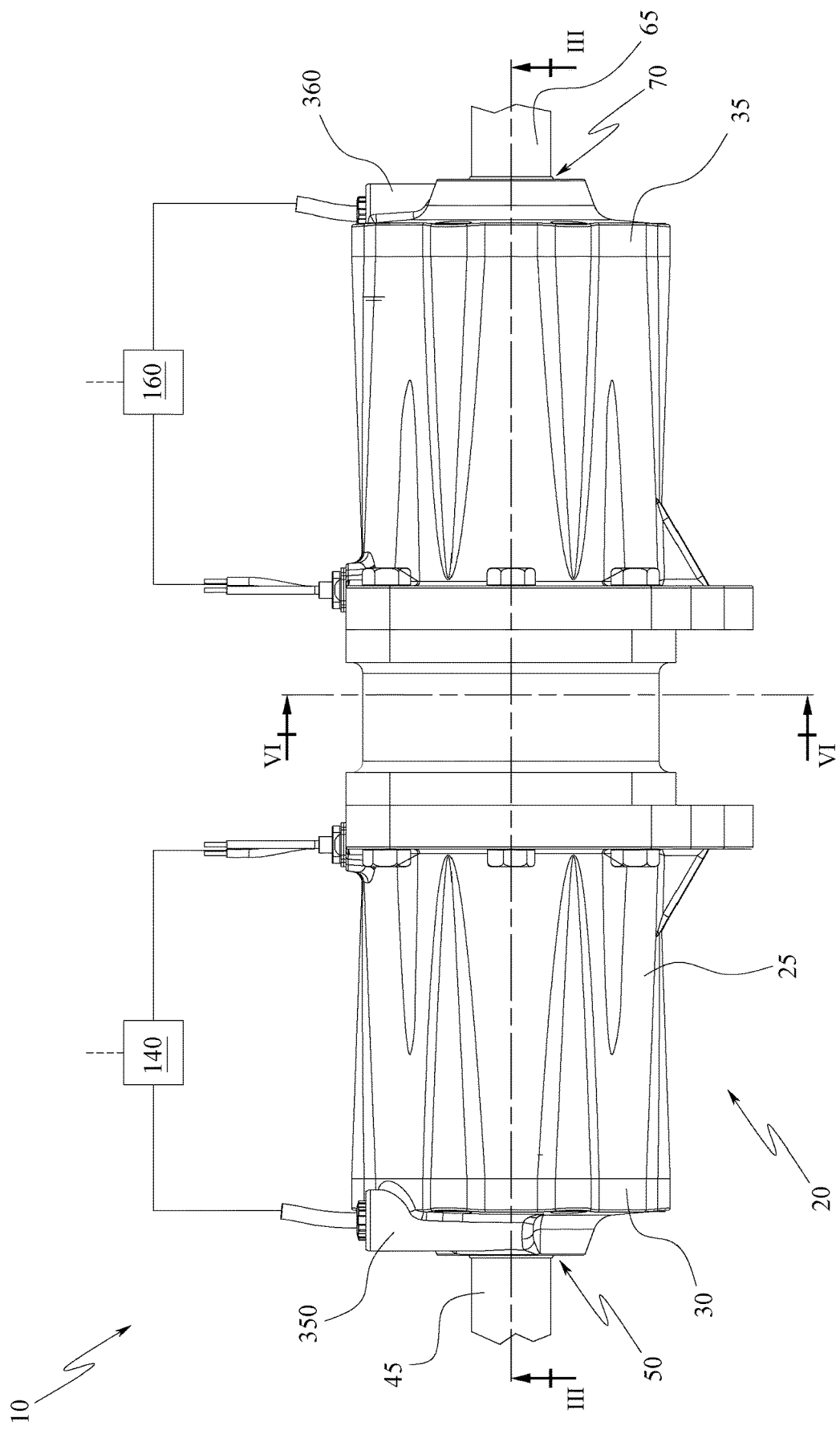
FIG. 2 is a side view of the actuator of FIG. 1.
Figure 16:
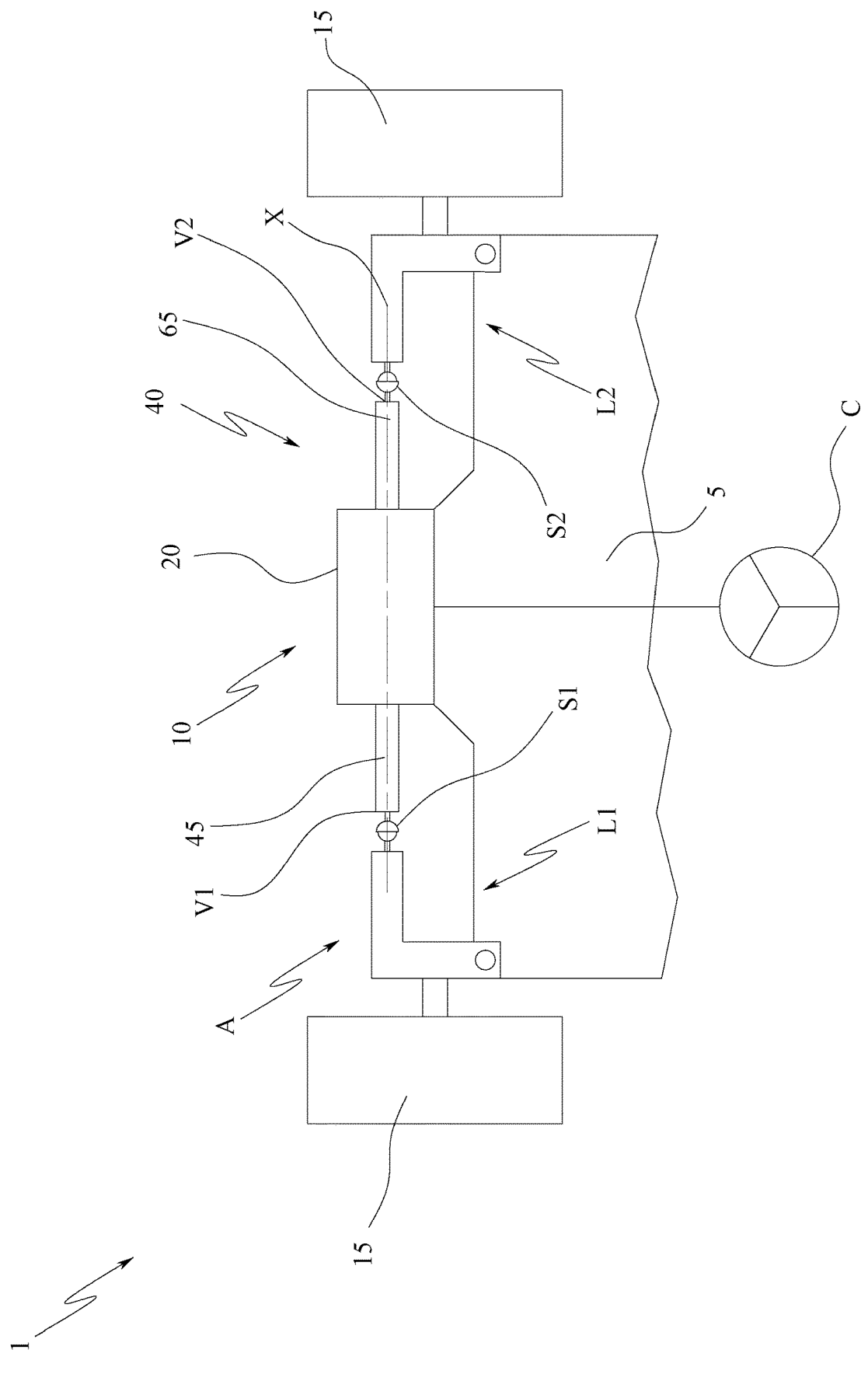
FIG. 16 is a diagram of a steering system according to the invention.
Figure 17:
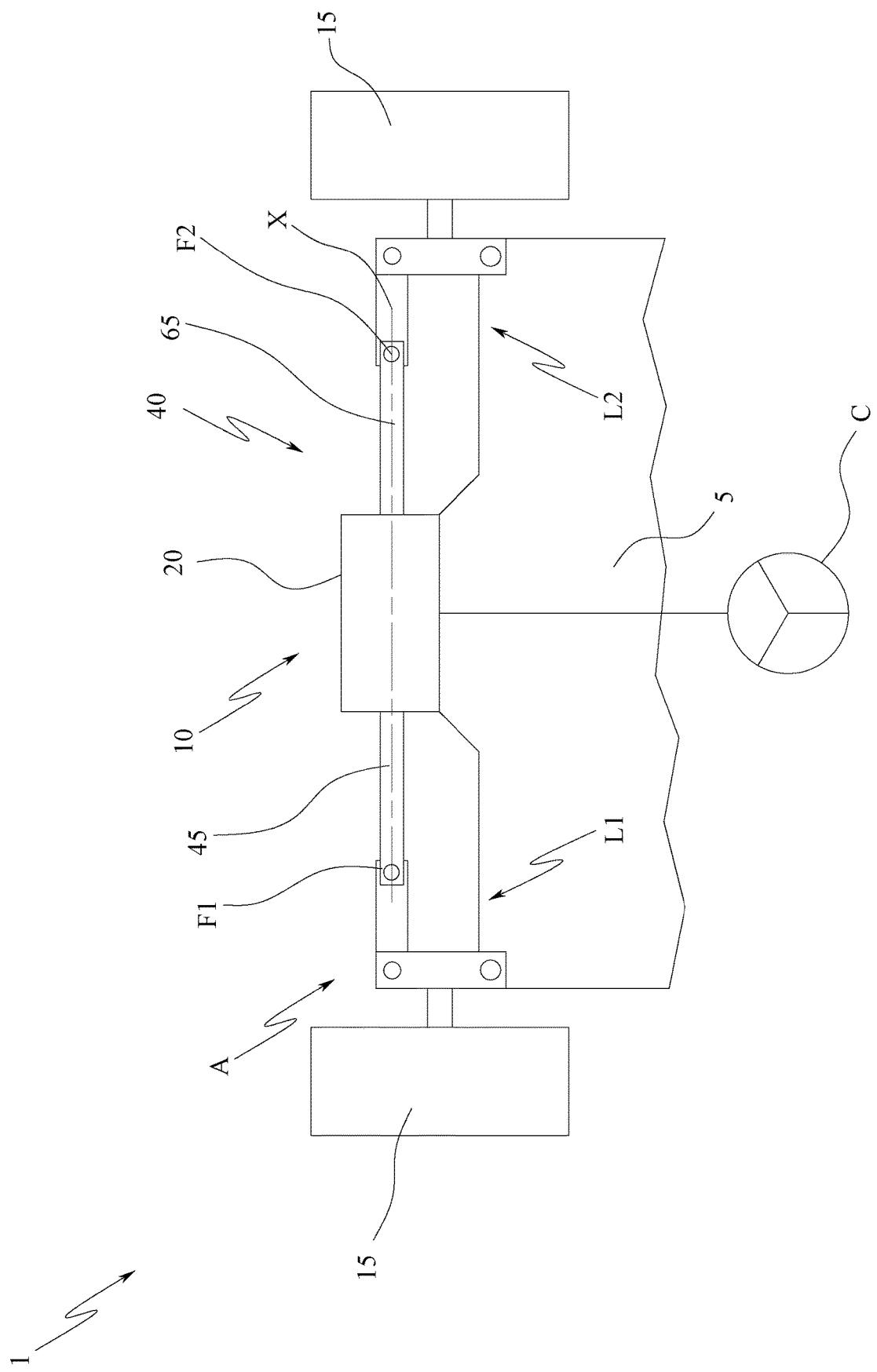
FIG. 17 is a further schematic diagram of a steering system according to the invention.

With particular reference to FIGS. 16 and 17, 1 generally designates a steering system for a vehicle equipped with a pair of steerable wheels 15.

The steering system comprises a first steering linkage L1 connected to a wheel 15, a second steering linkage L2 connected to another wheel 15, an electric linear actuator 10 adapted to actuate the linkages of steering L1, L2 and a control mechanism C, able to control actuator 10.

Alternatively, the steering system may comprise an actuator 10 for each steering linkage L1, L2.

The actuator 10 comprises a housing 20 intended to be fixed to a frame 5 of the vehicle, for example by means of a pair of fixing plates.

As shown in FIG. 1, casing 20 comprises a tubular portion 25 (of elongated shape), which, for example, has a rectangular cross section or circular and may be produced in an extrusion of aluminum or an iron casting.

Casing 20 also comprises a first head 30 and a second head 35 adapted to close the open ends of the tubular portion 25.

The first head 30 and the second head 35 are fixed to the tubular portion 25, for example by means of threaded members.

The first head 30 and the second head 35 may be made of high-strength steel, for example provided with a surface treatment hardener carried out over the entire surface of the head 30, 35.

The casing 20 may further comprise a number of cooling fins (not shown in the drawings) arranged on its outer surface.

The actuator 10 comprises a shaft 40 slidingly associated to the casing 20 according to a sliding axis X, and provided with at least one end that protrudes externally from said casing 20.

The sliding axis X is parallel to a longitudinal axis of the shaft 40 and to a longitudinal axis of the tubular portion 25 of the casing 20.

In one embodiment, the shaft 40 is provided with a first portion 45, for example of cylindrical shape which protrudes externally, at least in part, from the casing 20 and is slidably inserted with reduced clearance in an opening 50 cylindrical formed in the first head 30.

The first head 30 may comprise a bushing which defines the opening 50.

Such bushing may be produced in a high-strength steel equipped with a surface treatment hardener, e.g. nitriding.

Figure 3:
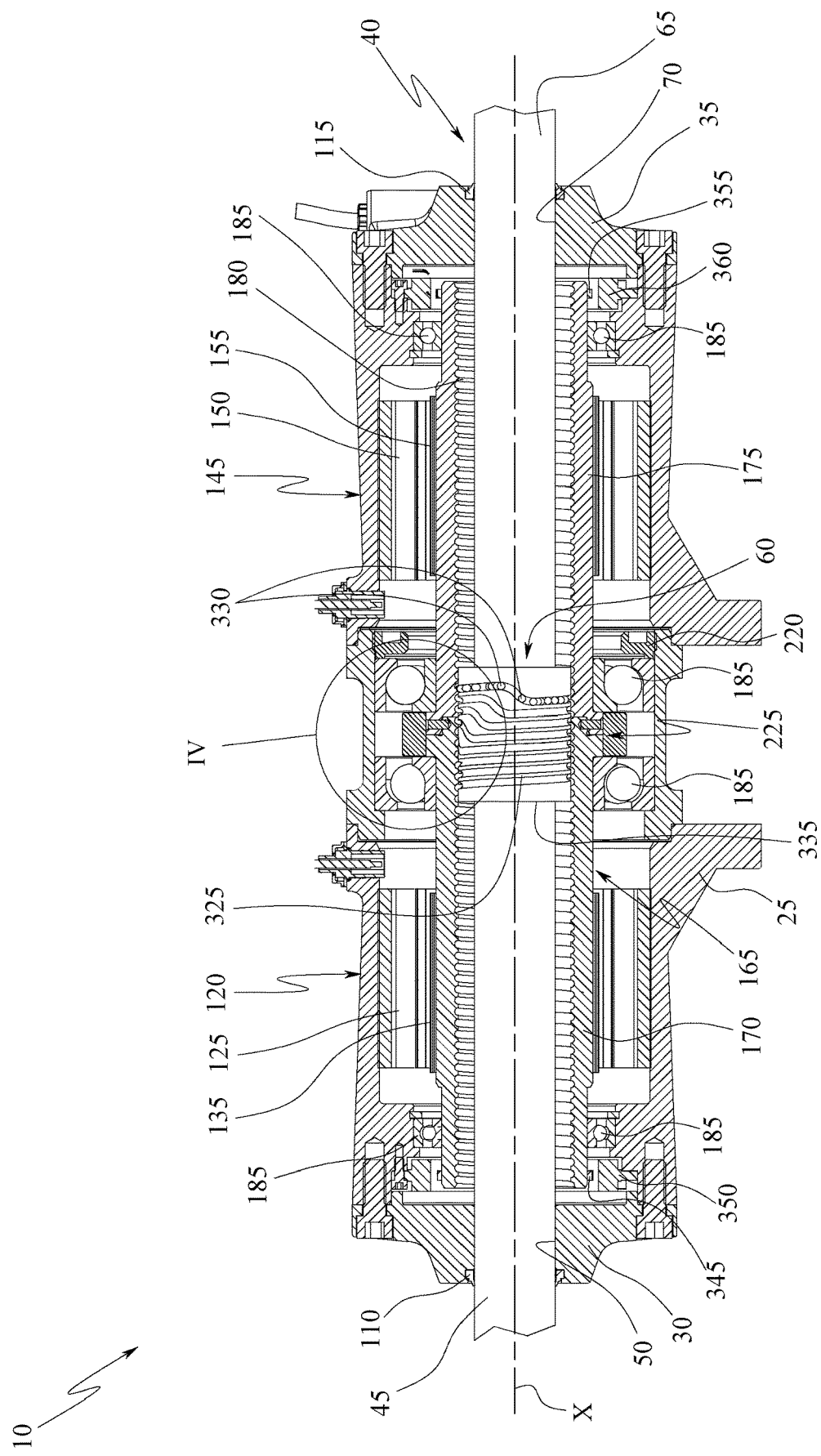
FIG. 3 is a sectional view of the actuator of FIG. 2 according to plane III-III.
Figure 4:
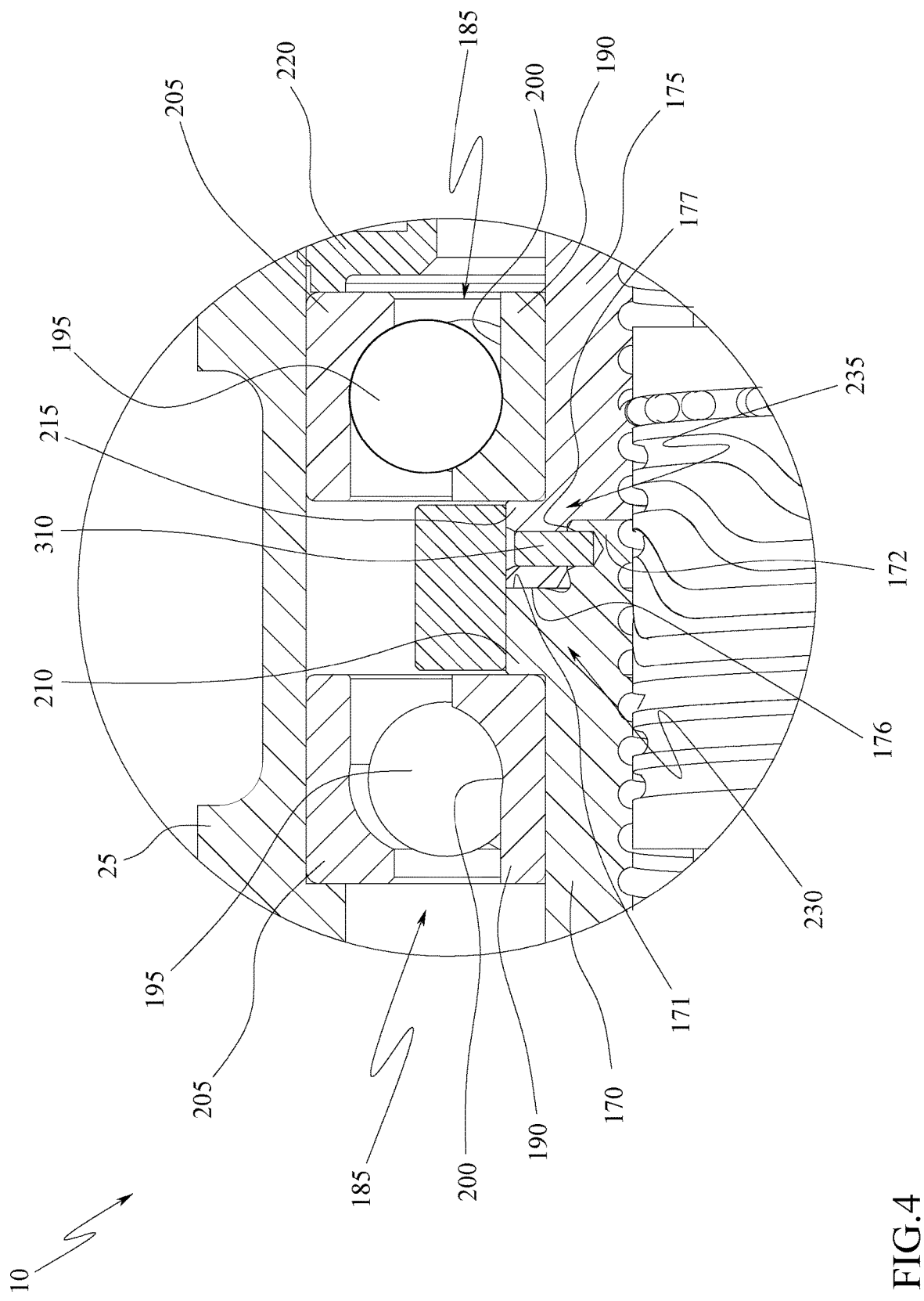
FIG. 4 is an enlargement of a detail (IV) of FIG. 3.

The shaft 40 also comprises a second portion 60, for example of cylindrical shape, on the side of the first portion 45 and contained within the casing 20 (see FIG. 3).

In practice, the second portion 60 always remains within a volume which is defined by the tubular portion 25 of the casing and delimited in the direction of the sliding axis X from the first head 30 and the second head 35.

That is, the second portion 60 does not pass through the first head 30 and the second head 35.

In the preferred embodiment illustrated in the drawings, the shaft 40 is provided with a third portion 65, for example of cylindrical shape which protrudes externally, at least in part, by the casing 20 and is slidably inserted with a reduced clearance in an opening 70, for example of cylindrical shape, formed in the second head 35.

The second head 35 may comprise a bushing that defines the opening 70.

Such bushing may be produced in a high-strength steel equipped with a surface treatment hardener, for example a nitriding surface treatment.

The third portion 65 is adjacent to the second portion 60 from the end opposite to the first portion 45.

In a first embodiment of the shaft 40 illustrated in FIGS. from 1 to 5, the shaft 40 has a circular and constant cross section along the whole axial extension of the shaft itself between the free end of the first portion 45 and the free end of the third portion 65.

The shaft 40 also comprises connecting elements with the steering linkage L1, L2 placed on the free ends of the first portion 45 and the third portion 65.

As shown in FIG. 17, these connection elements may comprise for example a first fork element F1, placed at the free end of the first portion 45 and by means of which the first portion 45 it is integrated (hinged) the first steering linkage L1, and a second fork element F2, placed at the free end of the third portion 65 and through which the third portion 65 is integrated (hinged) to the second steering linkage L2.

This embodiment of the connecting elements may be used in the field of forklift trucks.

In a second embodiment of the shaft 40 illustrated in FIGS. 8,9,10,14 and 15, the first portion 45 of the shaft 40 and the opening 50 are configured in such a way as to define a prismatic connection 80 having a sliding axis coinciding with the axis of sliding X.

In this way this prevents the shaft 40 from rotating with respect to the casing 20.

As shown in FIG. 16, this solution allows to connect the ends of the shaft 40 and the levers L1, L2 by means of two ball joints S1, S2.

For example, each ball joint S1, S2 has an end which is screwed into a respective threaded blind hole V1, V2 formed at a free end of the shaft 40 and an opposite end connected to a respective steering linkage L1, L2.

This solution allows the installation of the actuator 10 on agricultural and/or earthmoving vehicles.

To obtain the prismatic coupling 80, the first portion 45 of the shaft 40 comprises a flat surface 85, which lies on a plane parallel to the sliding axis X and is adapted to slide on a mating flat surface 90 formed in the opening 50.

The flat surface 85 does not protrude with respect to the second portion 60 of the shaft 40, i.e. the plane on which lies the flat surface 85 of the shaft 40 intersects on two points an imaginary circumference that defines the perimeter of the cross section of the second portion 60 of the shaft.

Advantageously, the flat surface 85 of the shaft 40 extends over the entire axial length of the first portion 45, i.e. from the free end of the first portion 45 at the end of the first portion 45 proximate to the second portion 60.

In addition, the flat surface 90 of the opening 50 has a width (in the direction perpendicular to the sliding axis X) substantially equal to the width (in the direction perpendicular to the sliding axis X) of the flat surface 85 of the shaft.

As may be seen in FIG. 14, the shaft 40 also comprises a connecting surface 95, for example concave, adapted to connect the flat surface 85 of the shaft 40 to the second portion 60 of the shaft 40, i.e. a cylindrical surface of the second portion 60.

This surface of the fitting 95, appropriately shaped, may act as a limit stop when the shaft 40 moves toward the opening 50 of the first head 30.

Finally, the flat surface 85 of the shaft 40 is delimited in the direction transverse to the sliding axis X by a pair of beveled edges 100 (see FIG. 14).

In practice, the first portion 45 is delimited in the radial direction from the flat surface 85 by the beveled and/or joined edges 100 and by a portion of the cylindrical surface 105 having a longitudinal axis parallel to the sliding axis X and which extends circumferentially by a beveled edge 100 to the other.

The flat surface 85 of the shaft 40 may for example be formed by chip removal machining (milling) by a first portion 45 of cylindrical shape.

Alternatively the prismatic connection 80 may be produced by means of one or more radial protrusions formed and/or connected to the first portion 45 of the shaft 40 and adapted to slide within respective complementary grooves formed in the opening 50.

For example the shaft 40 may comprise a key which is accommodated in a seat formed in the first portion 45 and adapted to slide in a complementary groove formed in the opening 50.

A further alternative may involve the presence of a number of flat surfaces 85, for example connected in such a way as to define a first portion 45 having a substantially polygonal transverse section.

This does not exclude that even the third portion 65 of the shaft 40 and the opening 70 of the second head 35 may be configured to define a further prismatic connection similar to the one described above.

The shaft 40 may be made of steel, for example C45 steel, and may for example receive a surface treatment.

The surface treatment may for example be a treatment with the addition of material, in particular a chromate treatment in electrolytic deposition or plasma or thermochemical treatment with subsequent oxidation.

Alternatively, the surface treatment with the addition of material may be a treatment of the application of a ceramic layer, for example with plasma or thermochemical with subsequent oxidation.

A further option envisages that the surface treatment is a thermochemical conversion treatment.

The actuator 10 comprises a first seal 110, housed in a seat formed in a portion of the first head 30, for example external with respect to the opening 50, which is adapted to surround a part of the shell of the first portion 45 of the shaft 40

In the first embodiment of the shaft 40, the first seal 110 has an annular shape provided with a central hole of circular shape.

In the second embodiment of the shaft 40, the first seal 110 has an annular shape, for example having an outer perimeter of any shape, and it is provided with a central hole in homologous form to the shape of the opening 50.

For example, the outer perimeter of the first seal 110 has a circular shape.

Preferably the central hole of the seal 110 has an area smaller than the area of the cross section of the first portion 45 of the shaft 40.

A second seal 115 is housed in a seat formed in a portion of the second external head 35 with respect to the opening 70 and it is suitable to surround a part of the shell of the third portion 65 of the shaft 40.

The second seal 115 has an annular shape, provided with a central hole of circular shape.

The seals 110,115 may for example be lip seals equipped with an outer lip, in direct contact with the shaft 40 and adapted to remove foreign bodies present on the shaft 40, and an inner lip in direct contact with the shaft 40 and adapted to prevent the leakage of lubricated liquid from the inside of the casing 20.

Figure 5:
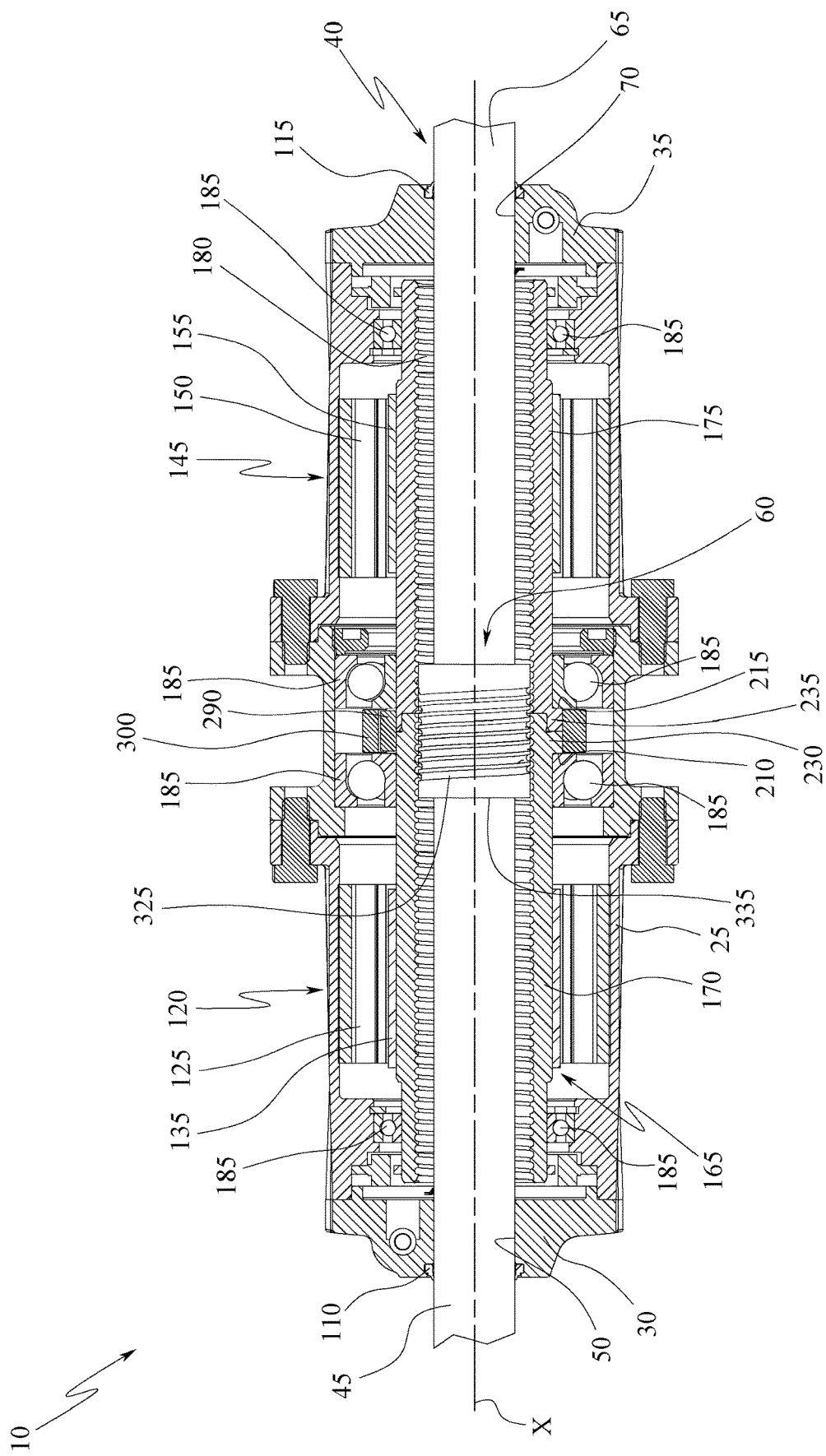
FIG. 5 is a sectional view of the actuator of FIG. 2 according to a plane perpendicular to plane III-III in correspondence with a longitudinal axis of the actuator.
Figure 8:
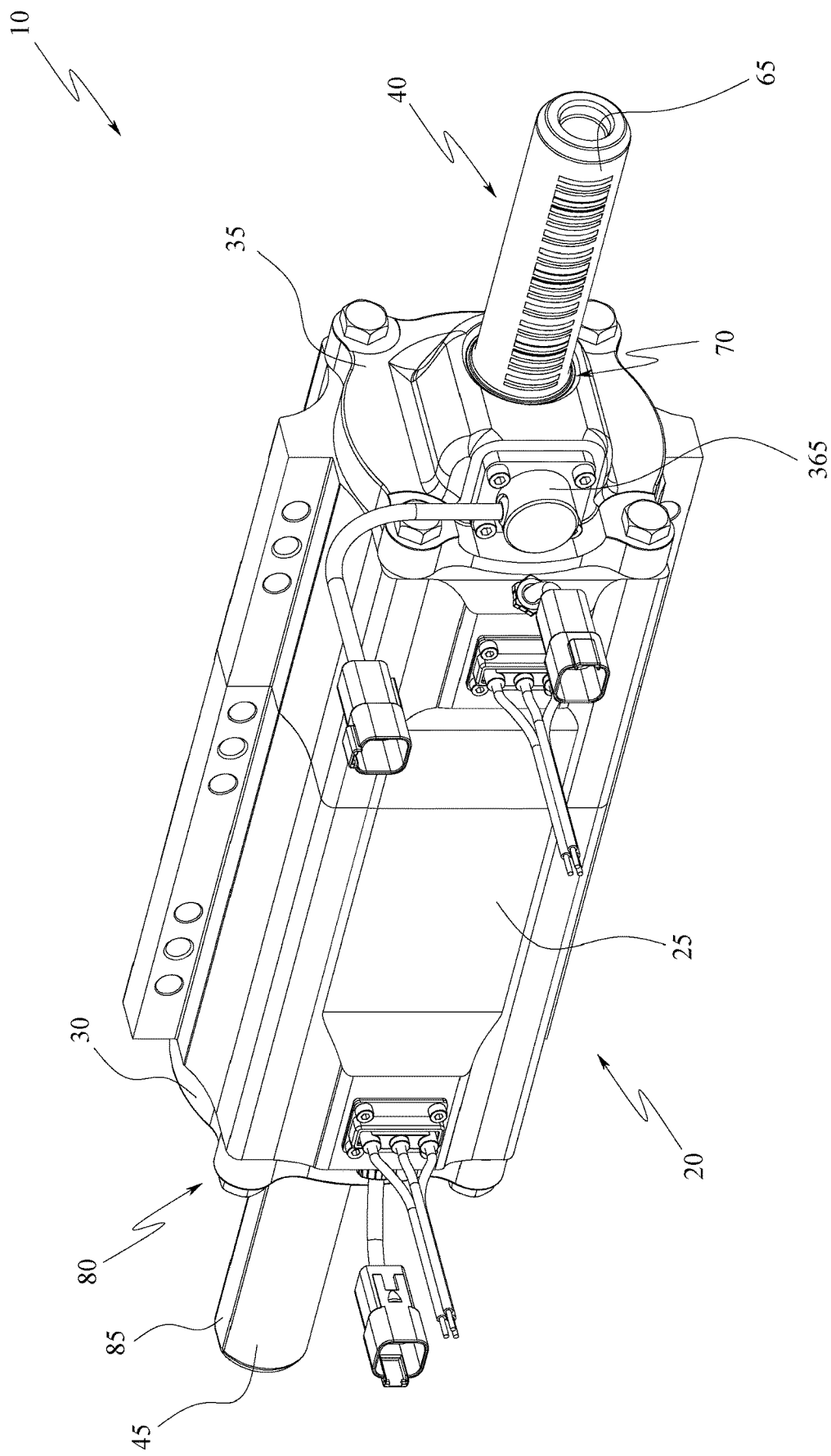
FIG. 8 is a perspective view of a different embodiment of the actuator according to the invention.
Figure 9:
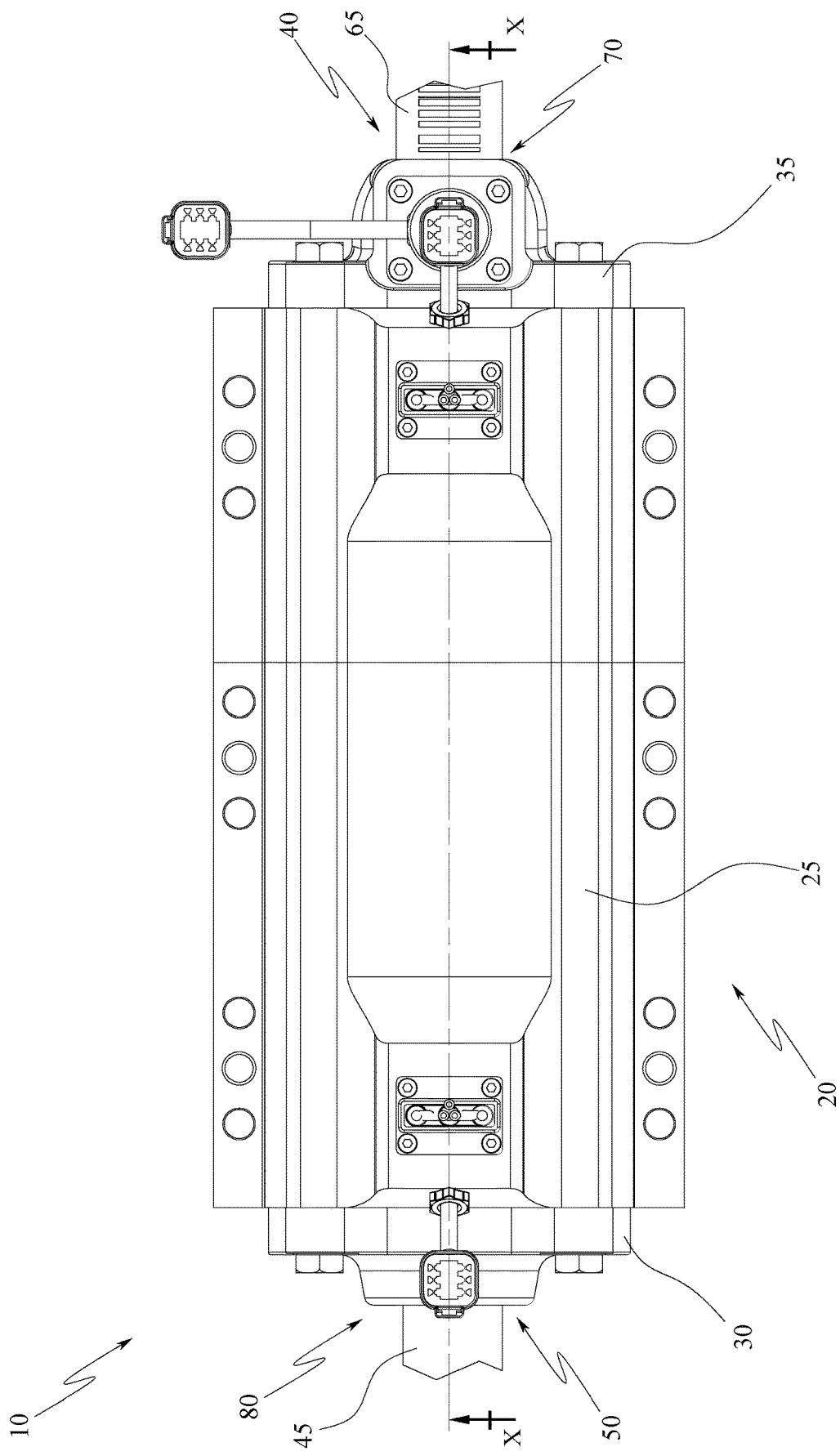
FIG. 9 is a side view of the actuator of FIG. 8.
Figure 10:
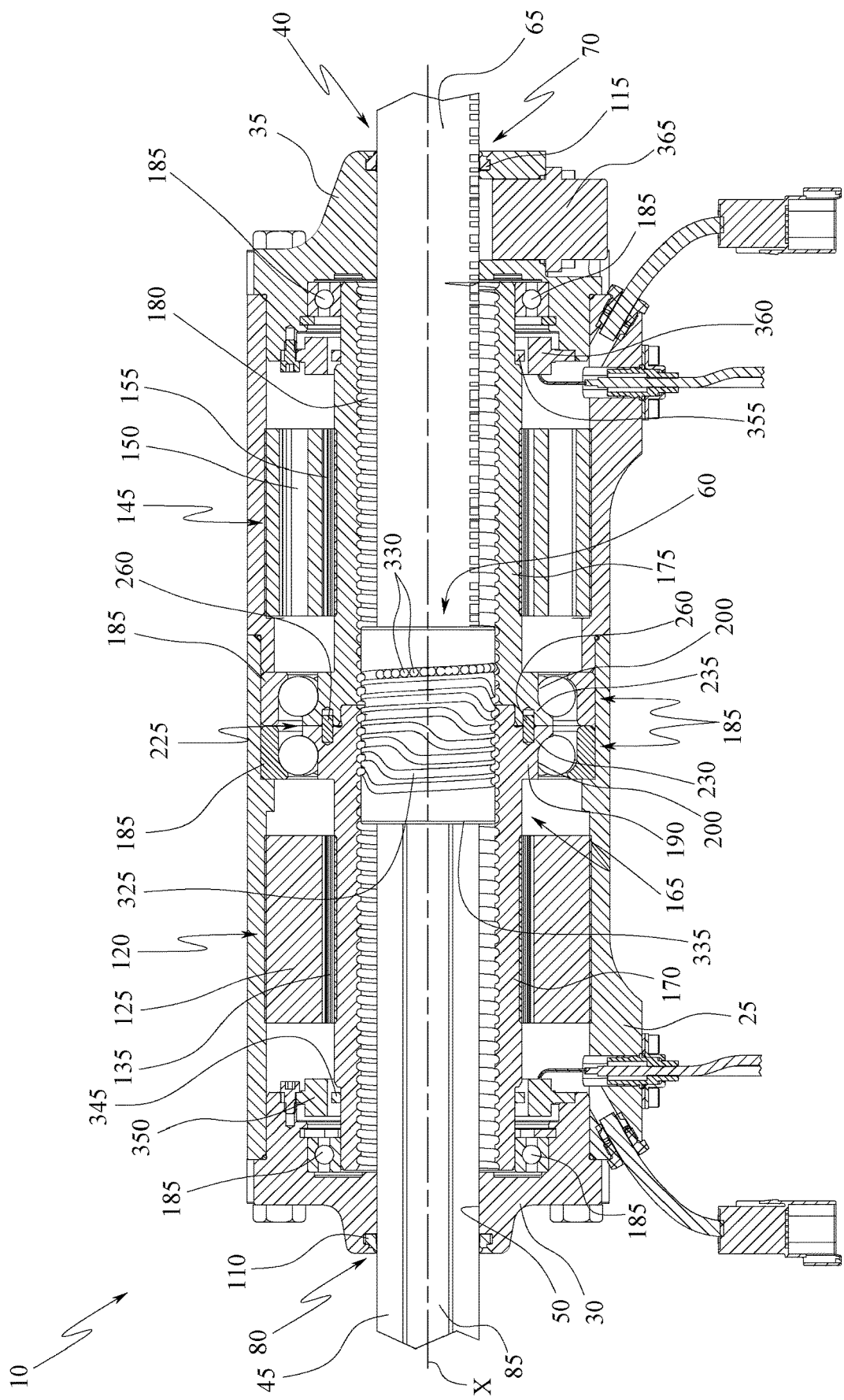
FIG. 10 is a sectional view of the actuator of FIG. 9 according to plane X-X.

The actuator 10 comprises a first electric motor 120, shown in FIGS. 3, 5 and 10, housed inside the casing 20 and, for example, coaxial with the shaft 40.

The first motor 120 is for example of the three-phase synchronous type.

The first motor 120 comprises a stator 125 fixed to the tubular portion 25 of the casing 20.

The stator 125 comprises a stator winding connected to the electric supply of the first motor 120.

The stator 125 may also comprise a second stator winding, distinct and independent from the other stator winding, connected to the electric supply of the first motor 120.

The first motor 120 comprises a rotor 135, concentric internally to the stator 125 and rotatably associated to the casing 20 with respect to a rotation axis that is substantially parallel to the sliding axis X.

The rotor 135 is provided with a tubular body, for example a circular cross section, and a number of permanent magnets arranged on the outer surface, i.e. facing the stator 125 of the tubular body.

The permanent magnets may for example be fastened to the tubular body by means of glues and/or threaded connections.

The first motor 120 is connected to a 140 control switch.

The actuator 10 also comprises a second electric motor 145, housed inside the casing 20 and axially adjacent to the first motor 120.

The second motor 145 is coaxial with the shaft 40, and it is for example of the three-phase synchronous type.

The second motor 145 comprises a stator 150 fixed to the tubular portion 25 of the casing 20.

The stator 150 comprises a stator winding connected to the electric supply of the second motor 145.

The electric power of the second motor 145 is distinct and independent from the electrical supply of the first motor 120.

For example the stator 150 may comprise a second stator winding, distinct and independent from the other, connected to the electric power of the second motor 145.

The second motor 145 comprises a rotor 155, concentric internally to the stator 150 and rotatably associated to the casing 20 with respect to a rotation axis that is substantially parallel to the sliding axis X.

The rotor 155 is provided with a tubular body, for example a circular cross section, and a number of permanent magnets arranged on the outer surface, i.e. facing the stator 150 of the tubular body.

The permanent magnets may for example be fastened to the tubular body by means of glues and/or threaded connections.

The second motor 145 is connected to a control switch 160, which is distinct from the switch 140 of the first motor 120.

The switch 140 of the first motor 120 and the switch 160 of the second motor are connected to a control unit of the entire actuator 10.

The actuator 10 comprises a nut screw 165, for example entirely contained within the casing 20.

The nut screw 165 extends in the axial direction from the first head 30 to the second head 35, i.e. it has an axial dimension that is substantially equal to the axial dimensions of the tubular portion 25 of the casing 20.

The nut screw 165 has a cylindrical axial cavity (provided with an inner surface facing the shaft 40) which extends from one end to the other of said nut screw 165.

The nut screw 165 comprises a first cylindrical portion 170 and a second cylindrical portion 175, which is axially adjacent to the first cylindrical portion 170 and comes into contact with it at a junction area.

In practice, the first cylindrical portion 170 comprises, at one of its axial ends in the junction area, a front surface 171 (i.e. lying on a plane substantially perpendicular to the central axis of the nut screw), adapted to overlap on a front surface 176, for example also having an annular shape, of an axial end of the second cylindrical portion 175 proximate to the first cylindrical portion 170.

The first cylindrical portion 170 and the second cylindrical portion 175 have the same axial length.

However it is not excluded that the first cylindrical portion 170 and the second cylindrical portion 175 may have an axial length which is different.

Moreover it is not excluded that the nut screw 165 may comprise cylindrical portions in a number greater than two.

In the preferred embodiment, the first cylindrical portion 170 comprises a centering ring 172 adapted to be inserted snugly, in a seat 177, for example cylindrical, formed in the second cylindrical portion 175.

This centering ring 172 is coaxial with the central axis of the nut screw 165 and projects axially with respect to the front surface 171.

For example the centering ring 172 has a cylindrical internal surface, for example forming part of an end portion of the cylindrical internal cavity of the nut screw 165.

In addition, the centering ring 172 comprises a cylindrical outer surface apt for contacting a complementary inner surface of the seat 177 formed in the second cylindrical portion 175.

The nut screw 165 is provided with an internal thread 180 (i.e. formed on the surface of the axial cavity of the female screw 165).

The internal thread 180 has a screwing axis coincident with the central axis of the nut screw 165, which for example coincides with the sliding axis X.

Preferably, the internal thread 180 extends along the entire axial dimension of the nut screw 165, i.e. It extends without interruption from the end of the first cylindrical portion 170 that is distal from the second cylindrical portion 175 at the end of the second cylindrical portion 175 that is distal from the first cylindrical portion 170.

For example, the internal cylindrical surface of the centering ring 172 is fully occupied by a portion of the internal thread 180.

Moreover, the internal thread 180 has convolutions with grooves having a cross section (i.e. defined by a plane containing the central axis of the nut screw 165) shaped as a gothic arch.

The internal thread 180 has a convolution in the junction area (i.e. a convolution which is partly made in the first cylindrical portion 170 and partly in the second cylindrical portion 175), which has a cross section having a width greater than the cross section of the other convolutions of the internal thread 180.

It is not excluded that the groove of the convolution in the junction area may have a cross section shaped differently from the gothic arch.

It should be noted that thread convolution means any portion of said thread which extends around the screwing axis of the thread according to an angle of about 360° and that throat means the three-dimensional curved surface between two adjacent crests of the thread.

The nut screw 165 is integrated in rotation with the rotor 135 of the first motor 120 and the rotor 155 of the second motor 145.

For example, the first cylindrical portion 170 is integrated in rotation with the rotor 135 of the first motor 120 and the second cylindrical portion 175 is integrated in rotation with the rotor 155 of the second motor 145.

The nut screw 165 is rotatably associated to the casing 20 by means of a number of bearings 185, for example housed in respective seats formed in the tubular portion 25 of the casing 20.

For example, the first cylindrical portion 170 is rotatably associated to the casing 20 by means of a pair of bearings 185 jobs at the axial ends of the first cylindrical portion and the second cylindrical portion 175 is rotatably associated to the casing 20 by means of a pair of bearings 185 placed at the axial ends of the second cylindrical portion itself.

The bearings 185 are of the rolling type, for instance a ball bearing.

Preferably, bearings 185 positioned in the junction area are angular contact ball bearings.

Each bearing 185 comprises an inner washer 190, a number of rolling bodies 195, a rolling surface 200 of said rolling body 195 formed in the inner washer 190 and an outer washer 205 provided with a surface for the rolling of rolling bodies 195.

The first cylindrical portion 170 comprises a shoulder 210 for its bearing 185 is located in the junction area, adapted to prevent the axial move toward the second cylindrical portion 175 of such a bearing 185.

The shoulder 210 contacts the inner washer 190 of said bearing 185.

The second cylindrical portion 175 comprises a shoulder 215 for its bearing 185 located in the junction area, adapted to prevent the axial move toward the first cylindrical portion 170 of such a bearing 185.

The shoulder 215 contacts the inner washer 190 of said bearing 185.

The actuator 10 comprises a device for adjusting the (axial) preload of the bearings 185.

This device also allows keeping in contact with the first cylindrical portion 170 and the second cylindrical portion 175.

However it is not to be excluded that the actuator 10 may comprise an adjustment device, different from the adjustment device of the preload of the bearings 185, to keep in contact with the first cylindrical portion 170 and the second cylindrical portion 175.

The adjustment device of the preload may for example comprise a 220 threaded ring nut 220, shown in FIGS. 3 and 5, which is screwed into a complementarily threaded portion of the casing 20 according to a screwing axis parallel to the sliding axis X.

This ring 220 comprises a thrust surface adapted to contact one of the bearings 185 of the first cylindrical portion 170 located in the junction area and the bearing 185 of the second cylindrical portion 175 located in the junction area.

For example, the thrust surface is adapted to make contact with a front surface of the outer washer 205 of the bearing 185.

In practice, the bearing 185 of the first cylindrical portion 170 located in the area of the joint is locked axially between shoulder 210 and a shoulder formed in the casing 20, and the bearing 185 of the second cylindrical portion 175 located in the area of the joint is locked axially between shoulder 215 and the ring 220.

In a different embodiment shown in FIG. 10, the actuator does not include the ring nut 220 to preload the bearings 185.

In this embodiment the tubular portion 25 of the casing 20 comprises a first tubular portion and a second tubular portion joined to form the tubular portion 25 by means of a number of axial studs, wherein each tubular portion comprises a shoulder designed to contact, from the distal side from the center of the junction area, the outer washer 205 of a respective bearing 185 placed in the junction area.

Moreover, in this embodiment, the inner washer 190 of each bearing 185 placed in the junction area is produced in a single body with the respective first cylindrical portion 170 or the second cylindrical portion 175.

By means of the clamping of the screw studs, bearings 185 located in the junction are pushed toward one another by the shoulders of the first and the second tubular portion, keeping in contact with the first cylindrical portion 170 and the second cylindrical portion 175.

In this embodiment the bearing 185 of the first cylindrical portion 170 proximate to the second cylindrical portion 175 may have a front surface, for example the inner washer 190, placed in contact with a front surface, for example the inner washer 190, of the bearing 185 of the second cylindrical portion 175 proximate to the first cylindrical portion 170.

In this way, the actuator 10 is particularly compact.

The actuator 10 comprises a joint 225 adapted to integrate in rotation the first cylindrical portion 170 and the second cylindrical portion 175.

The joint 225 comprises a first flange 230, for example annular, integrated in rotation with the first portion 170 and a second flange 235, for example annular, integrated in rotation with the second portion 175.

Preferably the first flange 230 and the first cylindrical portion 170 are produced in a single body.

In this way, the first flange 230 has a front surface that coincides with the front surface 171 of the first cylindrical portion 170.

As shown in FIGS. 3 and 5, the first flange 230 may for example provide the shoulder 210 of the first cylindrical portion 170.

In the alternative embodiment illustrated in FIG. 10, the first flange 230 and the inner washer 190 of the bearing 185 located in the junction area are made in a single piece with the first cylindrical portion 170.

That is the first flange 230 comprises the rolling surface 200 of the inner washer 190 of the bearing 185 placed in the junction area.

The second flange 235 and the second cylindrical portion 175 are advantageously made in a single body.

In this way, the second flange 235 has a front surface that coincides with the front surface 176 of the second cylindrical portion 175.

Moreover, the second flange 235 may for example provide the shoulder 215 of the second cylindrical portion 175.

As in the case of the first flange 230, the second flange 235 and the inner washer 190 of the bearing 185 are located in the junction area and made in a single piece with the second cylindrical portion 175.

That is the second flange 235 comprises the rolling surface 200 of the inner washer 190 of the bearing 185 placed in the junction area.

The joint 225 comprises connection means, for example removable, adapted to integrate in rotation the first flange 230 and the second flange 235.

For example the connection means comprise an axial protrusion 240 formed in a front surface (i.e. substantially perpendicular to the central axis of the nut screw 165), for example the front surface 176 of the second flange 235 and adapted to be inserted in a complementary groove 245 formed in a front surface, for example the front surface 171 of the first flange 230.

The axial protrusion 240 is preferably made in a single piece with the second flange 235, and for example it has a rectangular cross section.

The axial protrusion 240 and the complementary groove 245 have longitudinal axes that are substantially perpendicular to the central axis of the nut screw 165.

The axial protrusion 240 is configured so as to contact the side walls (i.e. substantially perpendicular to the front wall) of the groove 245.

In the embodiment illustrated in FIGS. 10 and 12, the connection means comprise a 260 axial pin, i.e. disposed with its longitudinal axis parallel to the longitudinal axis of the nut screw 165, adapted to be housed in a complementary blind hole 265 formed in the front surface, for example the front surface 171 of the first flange 230 and partly in a complementary blind hole 270 formed in the front surface, for example the front surface 176 of the second flange 235.

Preferably the connection means comprise a number of pins 260, e.g. angularly equidistant with respect to the central axis of the nut screw 165.

The pins 260 also perform the function of phasing the portion of the thread 180 of the first cylindrical portion 170 and the portion of the thread 180 of the second cylindrical portion 175.

Figure 13:
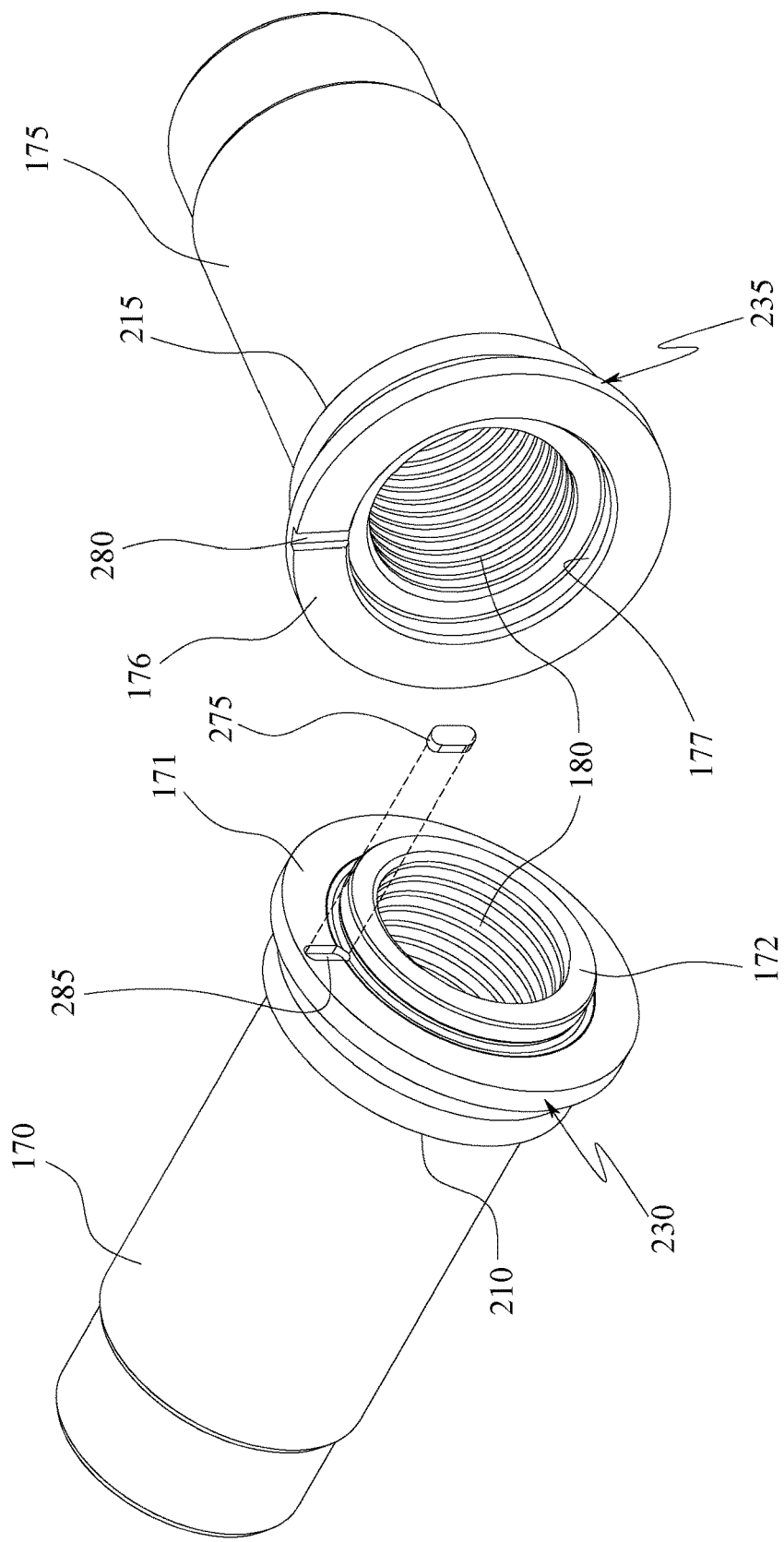
FIG. 13 is a view of a further embodiment of the nut screw of the actuator.

In the embodiment illustrated in FIG. 13, the connection means comprise a radial spline 275, i.e. having a longitudinal axis perpendicular to the central axis of the nut screw 165, adapted to be partially inserted in a groove 280 formed in the front surface, for example the front surface 176, the second flange 235, and in a recess 285 formed in the front surface, for example the front surface 171 of the first flange 230.

The groove 280 has a longitudinal axis that is perpendicular to the central axis of the nut screw 165, and for example extends from the seat 177 of the centring ring 172 to the side surface of the second flange 235.

The recess 285 is configured in such a way as to accommodate to measure the radial spline 275.

In the embodiment illustrated in FIGS. 5, 6 and 7, the connecting means comprise a axial key 290, i.e. a longitudinal axis parallel to the central axis of the nut screw 165, adapted to be at least partially inserted with reduced clearance in a pair of radial grooves 295 (i.e. extending from a side surface toward the central axis of the nut screw 165) formed respectively in the first flange 230 and in the second flange 235.

In the latter embodiment the connecting means comprise a retaining ring 300 adapted to embrace the first flange 230 and the second flange 235 and provided with a groove 305 (see FIG. 6) having a longitudinal axis parallel to the longitudinal axis of the axial key 290 and adapted to receive with reduced clearance a part of the axial key 290 that protrudes radially from the radial grooves 295.

In a further embodiment not shown in the drawings, the connecting means may comprise a pair of radial protrusions, each formed in a lateral surface of a respective flange 230, 235, and a retaining ring provided with a recess that is adapted to accommodate to measure said radial protrusions so as to integrate in rotation the flanges 230, 235.

The joint 225 also comprises a timing pin 310, shown in FIGS. 4,5,6 and 7, which is housed in a respective seat 315 formed in the first cylindrical portion 170 and a seat 320 formed in the second cylindrical portion 175.

Preferably the timing pin 310 has longitudinal axis substantially perpendicular to the central axis of the nut screw 165.

The seat 315 of the timing pin 310 is formed in the centering ring 172 and may for example be configured as a blind hole whose cavity is directed toward the outside of the nut screw 165.

The seat 320 of the timing pin 310 is for example produced in the second flange 235.

The seat 320 may for example be configured as a through hole that extends to the seat 177 of the centering ring 172 to the side surface of the second flange 235.

Preferably the joint 225 comprises a number of timing pins 310.

The actuator 10 comprises a helical groove outside 325 wound around the central axis of the shaft 40 and coupled to the nut screw 165 by means of a number of balls 330, i.e. interposed between the external helical groove 325 and the internal thread 180.

The actuator 10 comprises a cylindrical body 335, which is entirely contained within the casing 20, provided with an axial cavity and it is coupled to the shaft 40.

The cylindrical body 335 is provided with the external helical groove 325 (i.e. said helical groove is formed on a surface of the second cylindrical body 335 facing the nut screw 165).

It is not excluded that in an alternative embodiment, the helical groove 325 is formed on the outer surface (i.e. facing the nut screw 165) of the shaft 40, in particular of the second portion 60 of the shaft 40.

The cylindrical body 335 is fitted on the shaft 40 and is fixed thereto, i.e. the shaft 40 is inserted in the axial cavity of the cylindrical body 335.

Specifically, the cylindrical body 335 embraces and is fixed to the second portion 60 of the shaft 40 and may for example have an axial extension equal to the axial extension of said second portion 60.

The cylindrical body 335 is made as a separate body with respect to the shaft 40.

The cylindrical body 335 has a bulk in the radial direction such that the cylinder head 30 defines an abutment element to said cylindrical body 335, i.e. has an encumbrance such as not to be able to slide with respect to the shaft 40 through the opening 50 of the first head 30.

Preferably, the cylindrical body 335 has a size in the radial direction such that the cylinder head 35 defines an abutment element to said second cylindrical body 335, i.e. It has an size such as not to be able to slide with respect to the shaft 40 through the opening 70 of the second head 35.

The actuator 10 comprises means for recirculating, for example formed entirely in the cylindrical body 335, adapted to recirculate the balls 330 in the external helical groove 325.

The actuator 10 further comprises a first angular sensor equipped with an element 345 fixed to the first cylindrical portion 170 and a sensor 350 adapted to read the element 345 and housed in a seat formed in the tubular portion 25 of the casing 20.

The sensor 350 is connected to the switch 140 of the first motor 120.

The actuator 10 also comprises a second angular sensor equipped with an element 355 fixed to the second cylindrical portion 175 and a sensor 360 adapted to read the element 355 and housed in a seat formed in the tubular portion 25 of the casing 20.

The sensor 360 is connected to the switch 160 of the second motor 145.

The actuator 10 may also comprise a linear sensor 365 (shown in FIGS. 8, 9 and 10) adapted to provide information relating to the axial position of the shaft 40 along the sliding axis X.

Finally, the actuator 10 or the casing 20 is at least partially filled with liquid lubricant.

Alternatively or in addition, the recirculation means comprise a grease lubrication system.

The operation of the actuator 10 according to the invention is as follows.

When the first motor 120 and/or the second motor 145 are operated, the nut screw 165 is rotated around the central axis X and the shaft 40 cannot rotate because of the prismatic connection 80, and due to the fact that the steering linkage L1,L2 is hinged, the rotary motion of the nut screw 165 is transformed into a traversing motion of the shaft 40 along the central axis X.

The shaft 40 in its traversing motion pushes one of the two linkages while it pulls the opposite one, thereby tilting the steered wheels 15 with respect to the forward direction of the vehicle.

During the steering movement, a verification of the correct operation of the actuation is carried out by means of the angular sensors 350,360 and the linear sensor 365.

The presence of a first motor 120 and a second motor 145, each provided with an angular sensor 350,360 and a switch 140,160, ensures that even in the event of failure of any of these components, they do not compromise the functionality of the actuator 10

The invention thus conceived may undergo numerous modifications and variations, all of which are within the scope of the inventive concept.

Moreover all the details are replaceable by other technically equivalent elements.

In practice, the materials used, as well as the contingent shapes and dimensions, may be any according to the requirements without thereby departing from the scope of protection of the following claims.

The invention claimed is:

1. A steering system (1) equipped with a linear electric actuator (10), comprising:
    a casing (20),
    a shaft (40) slidably coupled to the casing (20) with respect to a sliding axis (X) and provided with an end that protrudes externally from said casing (20),
    an electric motor (120), which is housed in the casing (20) and is equipped with a stator (125) and a rotor (135) axially hollow and coaxial to the shaft (40), wherein the rotor (135) is operable in rotation in respect to a rotation axis parallel to the sliding axis (X),
    a nut screw (165) integrated in rotation with the rotor (135) of the motor (120) and provided with an internal thread (180), wherein said nut screw (165) comprises a first cylindrical portion (170) and a second cylindrical portion (175), axially arranged side by side, and wherein the internal thread (180) extends without interruption from an end of the first cylindrical portion (170) that is distal from the second cylindrical portion (175) to an end of the second cylindrical portion (175) that is distal from the first cylindrical portion (170),
    a joint (225) adapted to integrate in rotation the first cylindrical portion (170) and the second cylindrical portion (175), and
    a helical groove surface (325) integrated with the shaft (40) and coupled to the internal thread (180).

2. The steering system (1) according to claim 1 wherein the joint (225) comprises a first flange (230) integrated in rotation with the first cylindrical portion (170), and a second flange (235) integrated in rotation with the second cylindrical portion (175).

3. The steering system (1) according to claim 2 wherein the joint (225) comprises wherein the joint (225) comprises a timing pin (310) housed in a respective seat (315, 320) formed in the first flange (230) and the second flange (235).

4. The steering system (1) according to claim 2, wherein the actuator (10) comprises a number of rolling bearings (185), at least one of which is provided with a rolling surface (200) of rolling bodies (195), which is formed in between the first flange (230) and the second flange (235).

5. The steering system (1) according to claim 1, wherein the actuator (10) comprises: an additional electric motor (145), housed in the casing (20) and axially alongside the motor (120), equipped with a stator (150) and a rotor (155) that is axially hollow and coaxial with the shaft (40), in which the rotor (155) is operable in rotation with respect to an axis of rotation parallel to the sliding axis (X), and wherein the nut screw (165) is integrated in rotation with the rotor (155) of the additional motor (145).

6. A steering system (1) equipped with a linear electric actuator (10), comprising:
    a casing (20),
    a shaft (40) slidably coupled to the casing (20) with respect to a sliding axis (X) and provided with an end that protrudes externally from said casing (20),
    an electric motor (120), which is housed in the casing (20) and is equipped with a stator (125) and a rotor (135) axially hollow and coaxial to the shaft (40), wherein the rotor (135) is operable in rotation in respect to a rotation axis parallel to the sliding axis (X),
    a nut screw (165) integrated in rotation with the rotor (135) of the motor (120) and provided with an internal thread (180), wherein said nut screw (165) comprises a first cylindrical portion (170) and a second cylindrical portion (175), axially arranged side by side,
    a joint (225) adapted to integrate in rotation the first cylindrical portion (170) and the second cylindrical portion (175), and
    a helical groove surface (325) integrated with the shaft (40) and coupled to the internal thread (180),
    wherein the helical groove surface (325) is formed in a cylindrical body (335) that is axially hollow and fitted onto the shaft (40) and connected integrally thereto.

7. The steering system (1) according to claim 1, wherein the actuator (10) comprises a number of balls (330) interposed between the helical groove surface (325) and the internal thread (180) of the nut screw (165), for the coupling of the internal thread (180) with the helical groove surface (325), and recirculation means for the recirculation of balls (330).

8. The steering system (1) according to claim 7, wherein a convolution of the internal thread (180) at a junction area between the first cylindrical portion (170) and the second cylindrical portion (175) of the nut screw (165) has a cross section having a width greater than the cross section of the other convolutions of the internal thread (180).

9. The steering system (1) according to claim 1, wherein the shaft (40) is equipped with a first portion (45) slidably inserted, with respect to a sliding axis (X), in an opening (50) of the casing (20) and protrudes externally from said casing (20), in which the opening (50) and the first portion (45) of the shaft (40) are configured in such a way as to define a prismatic connection (80).

10. The steering system (1) according to claim 1, which comprises a steering linkage (A) mechanically connected to a free end of a first portion (45) of the shaft (40) protruding from the casing (20).

11. A linear electric actuator (10) for steering systems comprising:
- a casing (20),
- a shaft (40) slidably coupled to the casing (20) with respect to a sliding axis (X) and provided with an end that protrudes externally from said casing (20),
- an electric motor (120), which is housed in the casing (20) and is equipped with a stator (125) and a rotor (135) that is axially hollow and coaxial with the shaft (40), in which the rotor (135) is operable in rotation in respect to the rotation axis parallel to the sliding axis (X)
- a nut screw (165) integrated in rotation with the rotor (135) of the motor (120) and provided with an internal thread (180), wherein said nut screw (165) comprises a first cylindrical portion (170) and a second cylindrical portion (175), axially arranged side by side, and wherein the internal thread (180) extends without interruption from an end of the first cylindrical portion (170) that is distal from the second cylindrical portion (175) to an end of the second cylindrical portion (175) that is distal from the first cylindrical portion (170),
- a joint (225) adapted to integrate in rotation the first cylindrical portion (170) and the second cylindrical portion (175), and
- a helical groove surface (325) integrated with the shaft (40) and coupled to the internal thread (180).

\* \* \* \* \*